(12) United States Patent
Sluiman et al.

(10) Patent No.: US 7,523,463 B2
(45) Date of Patent: Apr. 21, 2009

(54) TECHNIQUE TO GENERICALLY MANAGE EXTENSIBLE CORRELATION DATA

(75) Inventors: Harm Sluiman, Scarborough (CA); Eric Labadie, Toronto (CA); Abdolreza Salahshour, Raleigh, NC (US); Douglas Andrew Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 10/703,036

(22) Filed: Nov. 6, 2003

(65) Prior Publication Data

US 2004/0237093 A1 Nov. 25, 2004

(30) Foreign Application Priority Data

Mar. 28, 2003 (CA) .................................. 2424006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/318; 719/313; 709/224
(58) Field of Classification Search ................. 719/313, 719/318; 709/223–224
See application file for complete search history.

(56) References Cited

U.S. PATENT DOCUMENTS

| | | | | |
|---|---|---|---|---|
| 4,057,785 A | * | 11/1977 | Furniss et al. .......... | 340/870.15 |
| 5,740,354 A | * | 4/1998 | Ben-Natan et al. ............ | 714/45 |
| 6,018,700 A | * | 1/2000 | Edel ............................. | 702/60 |
| 6,061,723 A | | 5/2000 | Walker et al. ................ | 709/224 |
| 6,314,104 B1 | | 11/2001 | Spinner ...................... | 370/395 |
| 7,093,236 B2 | * | 8/2006 | Swaine et al. ............... | 717/128 |
| 2002/0059299 A1 | | 5/2002 | Spaey ......................... | 707/224 |
| 2002/0152185 A1 | * | 10/2002 | Satish Jamadagni ........... | 706/1 |
| 2004/0122942 A1 | * | 6/2004 | Green et al. ................. | 709/224 |

OTHER PUBLICATIONS

Johnson, The Application Response Measurement (ARM) API, Version 2, Tivoli Systems, Dec. 1997, pp. 1-11.*
Johnson, ARM 3.0—Enabling Wider Use of ARM in the Enterprise, Tivoli Systems, 1999, pp. 1-10.*
The Open Group, Application Response Measurement—Issue 3.0—Java Binding, The Open Group, 2001, pp. 1-103.*
Banks, et al.; TDB: "Two-Phase Commit Resynchronization"; Jan. 1996, pp. 79-80.

* cited by examiner

*Primary Examiner*—Thomas Lee
*Assistant Examiner*—Diem K Cao
(74) *Attorney, Agent, or Firm*—Volel Emile; Herman Rodriguez (57) ABSTRACT

A technique to generically manage extensible correlation data is provided for correlating a series of events. The technique employs a global unique identifier (GUID) for identifying an event and uses the GUID as a key to associate one or more extensible correlators of correlation data. A transport correlator may be configured to transport the GUID for associating with a GUID of a second event such that a small and fixed amount of data is passed by the communications layer providing the transport, minimally impacting communications. An arbitrary amount of data may be logged and keyed with the GUID, providing optimization and flexibility.

2 Claims, 9 Drawing Sheets

FIG. 5D

TECHNIQUE TO GENERICALLY MANAGE EXTENSIBLE CORRELATION DATA

TECHNICAL FIELD

This invention relates to computing systems, including distributed computing systems and more particularly to a technique to generically manage extensible correlation data in computing systems.

BACKGROUND OF THE INVENTION

Computing systems today are often complex, involving many integrated applications executing on one or more computing systems. Yet, when problems occur with such systems, analysis is often hampered by the complex nature of the computing.

Most computing systems such as individual servers in a distributed computing environment are configured, via a logging or other instrumentation service provider, to generate reasonably useful logs of their own activity. Servers further provide tools to assist a system administrator to analyze the server logs for problem determination. Many middleware applications that facilitate communication between other applications also provide a logging service and analysis tools. However, it is common today for a distributed application configuration to include six or more independent servers located on a multitude of physical machines. Correlation of the various error or other event logs from each of the applications, especially those applications on different physical machines, is complex and may not be possible.

Correlation is the process of relating information based on the contents of the information. For example, correlation is used to determine relationships (both implicit and explicit) between instrumentation information captured in instrumentation artefacts generated by an instrumentation service. Such artefacts may comprise trace records, log records, and messages generated by a computer system.

How correlated events are related to one another may be determined by the type of correlation. Associative correlation is used to group events that are related to one another, such as a set of events describing the processing of a specific request.

Associative correlation is typically performed using one of two methods: a) A unique ID is created that is used by all related events; or b) Each event is assigned a unique ID and information is provided which relates the IDs associated with related events.

Sequential correlation is used to order events sequentially, in the order in which the events occurred to indicate flow. Sequential correlation can be used to order log and trace records created by a product or show the order in which events occurred between several products.

Sequential correlation may be implemented in a number of different ways. In many products, the sequence of events may be implicitly defined by the order of the events in a log. In other products, a timestamp is used to sequence the events. However, event order in a log may be misleading and a timestamp may not be sufficiently granular. Neither method addresses products which use distributed logs on two or more distributed computers having clocks out of synchronization.

Environmental correlation is a special type of associative correlation, in that an association is drawn between an event and the environment (e.g. execution environment) that created the event.

The scope of correlation defines the range of events to be correlated.

There are two general scopes of correlation, intra-log correlation (the relating of events within a log) and inter-log correlation (the relating of events within separate logs).

Correlation is typically performed by using information contained in the event logs to determine relationships between the events.

Deterministic correlation creates relationships between events by using explicit correlation information contained in each event to determine the relationships within the data.

Correlating data using explicit data correlation is usually reliable, limited only by the type of correlation (associative, sequential, environmental) provided by the data correlators used. Deterministic correlation can only be performed for those software products (e.g. applications) that capture the explicit correlation information (correlators) in their event information. With few exceptions, today's products do not include correlation information in their data and must be modified (re-instrumented) to add the correlator information to their existing log and trace information. In other words, deterministic correlation cannot be used for all products in a computing solution until each of the products has been modified to provide explicit correlation information.

Deterministic correlation between products requires the products to exchange correlator information which is then captured in the events created by the products. Therefore, not only must each product be re-instrumented to capture the correlator information in their events, but the products must also be modified to exchange correlator information with other products. Often, there are performance impacts involved in exchanging correlation information during runtime, requiring coordinated usage models between the products. Adding correlation information to a product to product communication may adversely impact performance when that added information is too large or of unfixed size.

Some products recognise the need for correlators between events that occur within the same or on separate servers in a distributed application environment. For example, one product, Tivoli® ARM (application response measurement) measures service response levels for transactions in a distributed environment. Tivoli is a registered trademark of International Business Machines Corporation. ARM employs transaction correlators to provide a capability to break down a transaction into its component parts, so that the contribution of each part to the total response time can be analyzed.

In accordance with ARM, each application responsible for a component of the overall transaction to be measured is modified to include calls to ARM via an application programming interface (API). The calls may request correlators for transactions with one or more child transactions (i.e. a transaction invoked in response to the requesting or parent transaction), send the assigned correlators to the child transaction(s) along with the data needed to invoke (i.e. cause the occurrence of) the child transaction(s) and pass correlators received from parent transactions to the ARM measurement agents.

ARM measurement agents follow conventions when creating correlators in accordance with a defined format. Included within the correlator is environment information identifying the computer, the transaction class, the transaction instance, and some flags. The ARM correlator format is somewhat flexible and extendible; however, the correlator and the framework for handling it are specific to the needs of the ARM service. The size of the ARM correlator may adversely impact performance in some scenarios. That is, it is not a generic correlator per se for use by one or more varied service applications. Moreover, ARM correlators provide identification only to the level of a transaction instance.

A solution to some or all of these limitations or problems is therefore desired.

SUMMARY OF THE INVENTION

A technique to generically manage extensible correlation data is provided for correlating a series of events. The technique employs a global unique identifier (GUID) for identifying an event and uses the GUID as a key to associate one or more extensible correlators of correlation data. A transport correlator may be configured to transport the GUID for associating with a GUID of a second event such that a small and fixed amount of data is passed by the communications layer providing the transport, minimally impacting communications. An arbitrary amount of data may be logged and keyed with the GUID, providing optimization and flexibility.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
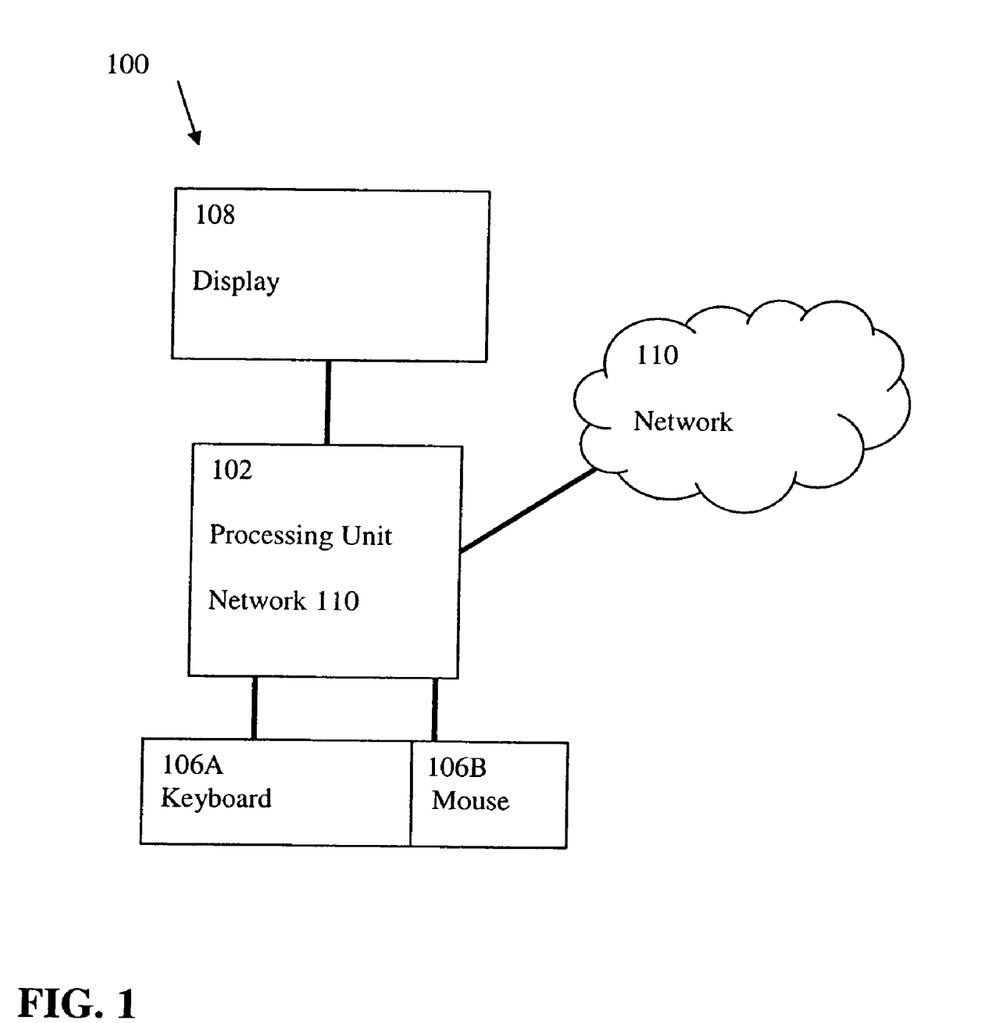
FIG. 1 schematically illustrates a computer embodying aspects of the invention.

An embodiment of the invention, computer system 100, is illustrated in FIG. 1. Computer system 100, which is illustrated for exemplary purposes as a single computing device, is adapted to communicate with other computing devices (not shown) using network 110. As will be appreciated by those of ordinary skill in the art, network 110 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100, using one or more networks such as, for example network 110. However, for ease of understanding, aspects of the invention have been embodied in a single computing device—computer system 100.

Computing device 100 typically includes a processing system 102 which is enabled to communicate with the network 110, various input devices 106, and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 102. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
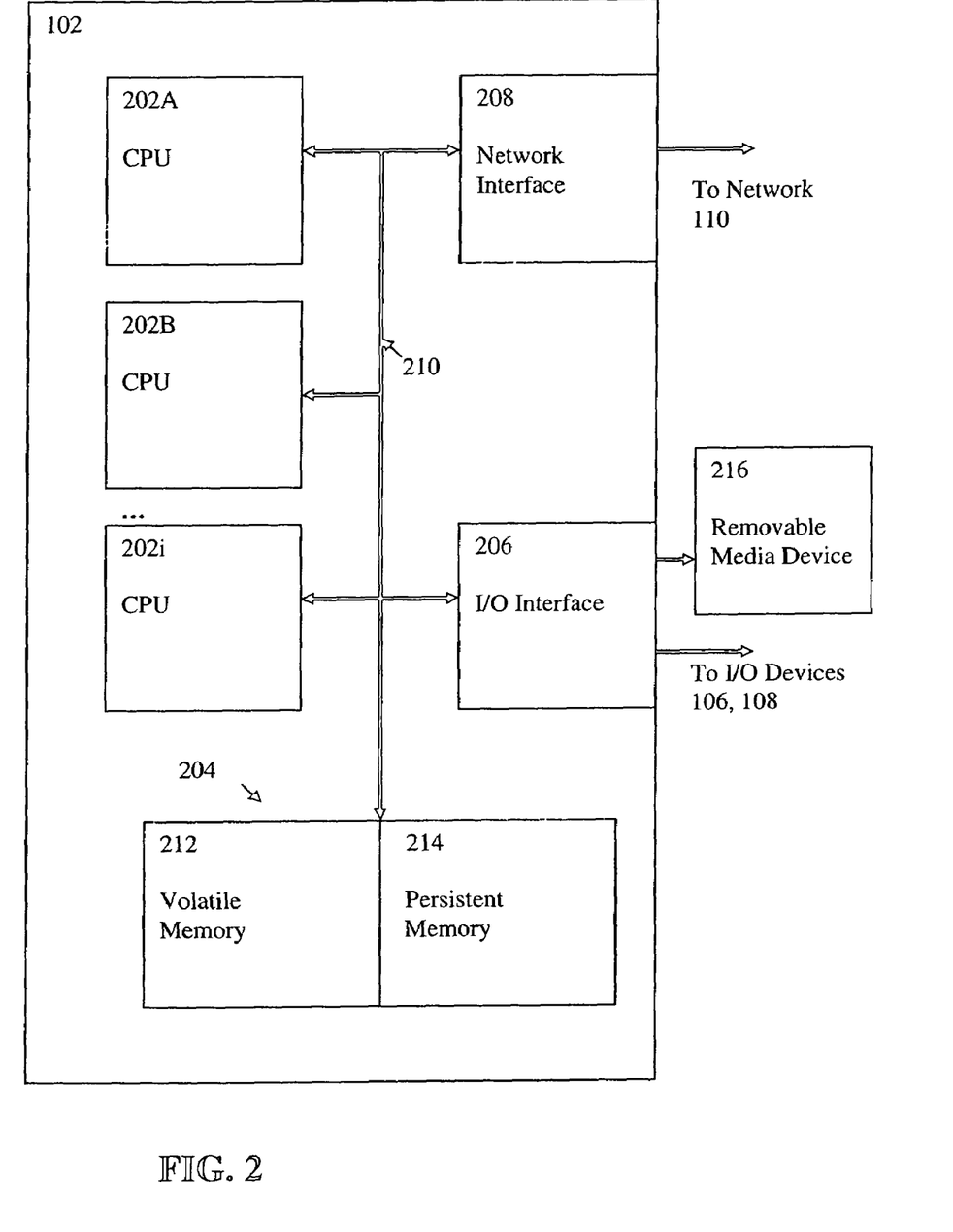
FIG. 2 schematically illustrates in greater detail a portion of the computer of FIG. 1.

Exemplary processing system 102 is illustrated in greater detail in FIG. 2. As illustrated, processing system 102 includes a number of components: a plurality of central processing units (CPUs) 202A, 202B, . . . 202i, collectively 202; memory 204; network interface (I/F) 208; and input-output (I/O) interface 206. Communication between various components of the processing system 102 may be facilitated via a suitable communications bus 210 as required.

Each CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 102 could use alternative CPUs and may include embodiments in which one CPU is employed (not shown). CPUs 202 may include various support circuits to enable communication between CPUs 202 and the other components of processing system 102.

Memory 204 includes both volatile memory 212 and persistent memory 214 for the storage of: operational instructions for execution by CPUs 202; data registers; application and thread storage; and the like. Memory 204 preferably includes a combination of random access memory (RAM), read only memory (ROM), and persistent memory such as that provided by a hard disk drive.

Network I/F 208 enables communication between other computing devices (not shown) and other network computing devices via network 110. Network I/F 208 may be embodied in one or more conventional communication devices. Examples of a conventional communication device include: an Ethernet card; a token ring card; a modem, or the like. Network I/F 208 may also enable the retrieval or transmission of instructions for execution by CPUs 202, from or to a remote storage media or device via network 110.

I/O interface 206 enables communication between processing system 102 and the various I/O devices 106 and 108. I/O interface 206 may include, for example a video card for interfacing with an external display such as output device 108. Additionally, I/O interface 206 may enable communication between processing system 102 and a removable media device 216. Removable media 216 may comprise a conventional diskette or other removable memory devices such as Zip™ drives, flash cards, CD-ROMs, static memory devices, and the like. Removable media 216 may be used to provide instructions for execution by CPUs 202 or as a removable data storage device.

Figure 3:
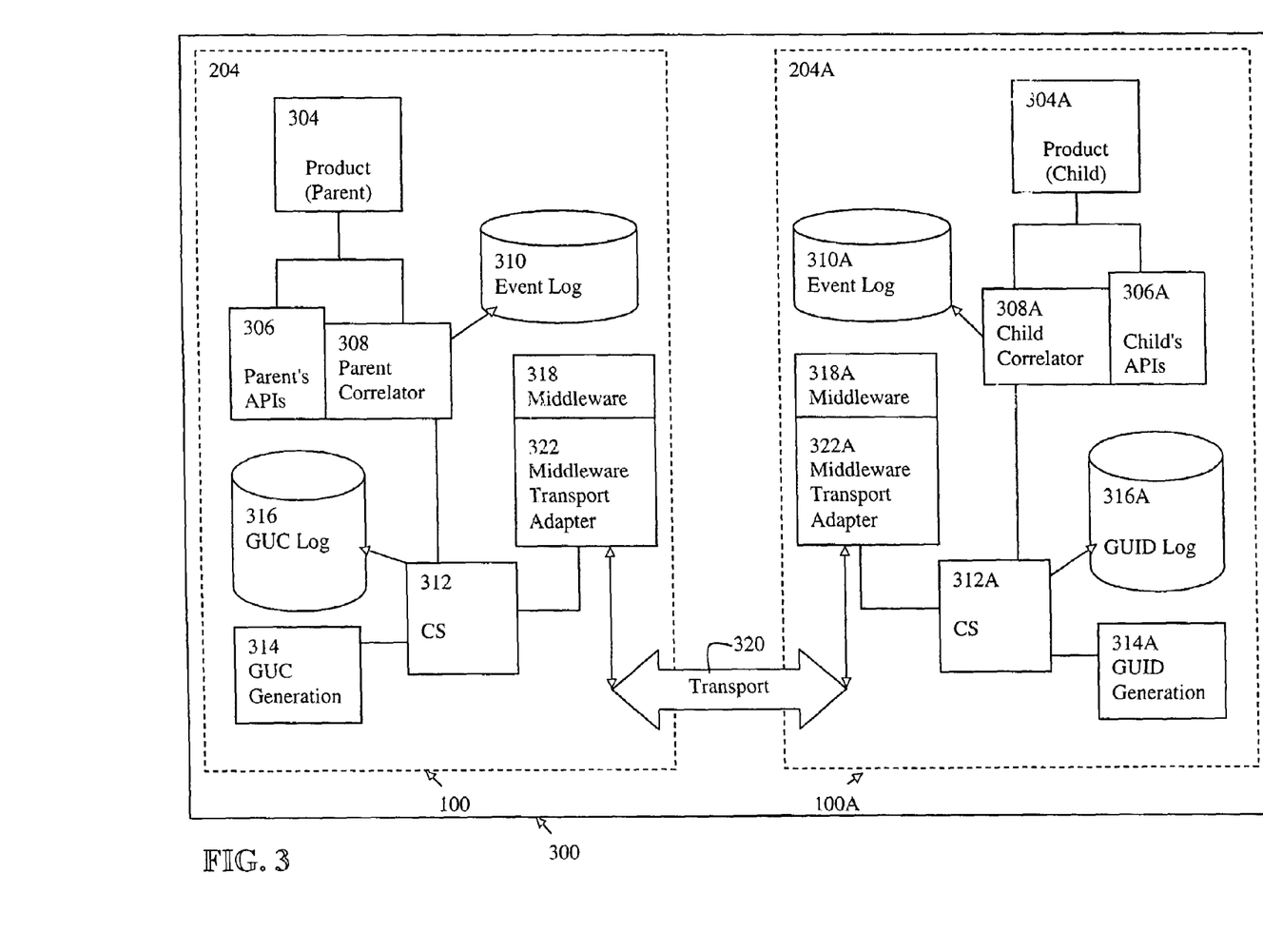
FIG. 3 illustrates in functional block form a portion of the memory illustrated in FIG. 2.

The computer instructions/applications stored in memory 204 and executed by CPUs 202 (thus adapting the operation of computer system 100 as described herein) are illustrated in functional block form in FIG. 3. As will be appreciated by those of ordinary skill in the art, the discrimination between aspects of the applications illustrated as functional blocks in FIG. 3, is somewhat arbitrary in that the various operations attributed to a particular application as described herein may, in an_alternative embodiment, be subsumed by another application.

FIG. 3 illustrates a distributed computing system 300 comprising computer system 100 in communication with a like configured computer system 100A. For convenience, like parts of computer system 100A are referenced with like references used for system 100 but which references include the identifier "A" as a suffix. As illustrated for exemplary purposes only, memory 204, 204A (FIG. 3) stores applications and data for enabling the operation of system 100, 100A to provide a technique to generically manage extensible correlation data. In this exemplary configuration, memory 204 therefore stores a software product 304 adapted in accordance with the invention which, for exemplary purposes, initiates a transaction and is referred to as a "parent" (i.e. product(parent)). Product(parent) 304 is adapted to use an instrumentation service for logging events of product(parent) 304 via an application programming interface (API) 306 referred to as "parent's API".

As is understood to persons skilled in the art, one manner of incorporating a service such as a logging provider into an application is to include invocations of the provider service via an API at selected points in the application code that define an event of interest to be logged by the logging provider. In a distributed computing environment, particular events of interest are those involving communications, via middleware or other transport mechanisms, between the application (e.g. client) executing on one machine and another process (e.g. server) running on second machine located remotely from the first machine. These events of interest often require correlation.

Parent's API 304 interfaces with a correlator service (CS) 312 in accordance with the invention using a parent correlator 308 and stores events to an event log 310. Correlator service 312 uses a globally unique correlator (GUC) generation mechanism 314 to obtain a GUC for events and stores GUCs and other event data as will become apparent to a GUC log 316. Product(parent) 304 communicates with a product(child) 306A via middleware 318 over a transport 320. Product (child) 304A is referred to as a "child" as it responds to an exemplary transaction initiated by product(parent) 304 as described further herein below with reference to FIGS. 5A-5D. As such, instrumentation API 306A is referred to as a child's API 306A and its correlator is a child correlator 308A.

Middleware 318 is adapted with a middleware transport adapter 322. Though only a single middleware is shown, it is understood that if computer system 100 or 100A communicates via more than one type of middleware (e.g. SOAP over HTTP, ORB and RMI-IIOP, JDBC etc.) a middleware adapter for each type is provided. Transport 320 provides, through interaction with an operating system and network I/F 208 (FIG. 2) suitable communication protocols to enable communication with other networked computing devices via network 110 (FIG. 1). Transport may include one or more of such protocols such as TCP/IP, Ethernet, token ring and the like and higher layer protocols such as hyper text transfer protocol, (HTTP).

Though not shown, memory 204, 204A stores an operating system (OS) and other support software for product(parent) 304, product(child) 304A, such as an application server as may be necessary.

The OS stored by memory 204, 204A is an operating system suitable for operation with selected CPUs 202 and the operations described herein. Multi-tasking, multi-threaded OSes such as, for example IBM AIX™, Microsoft Windows, Linux, or the like, are expected to be preferred in many embodiments. Depending on the OS, different execution environments may be configured for system 100, 100A (note that OS for system 100 need not be the same OS employed for system 100A). Correlation in accordance with the invention may be adapted to a variety of execution environments such as the following:

A thread of execution, such as a UNIX pthread. Threads represent the lowest dispatchable environment within a system.

A system process, such as a UNIX process. Processes represent a set of related threads, all of which share the same set of system resources.

A system, which is the environment in which the processes execute. A simple system is a single machine, but complex systems, such as a system with multiple virtual systems, or a system cluster, are possible and within the cope of the present invention. In the most general sense, a system is: the combination of one or more of the following:

A virtual execution environment, such as a VMWARE™ virtual system or an OS/390™ LPAR (logical partition);

A physical execution environment, e.g. an actual server machine, which may contain multiple virtual execution environments; and A cluster, which is a group of virtual or physical execution environments into a single collaborative execution environment.

As described further herein below, the respective correlator service 312, 312A, GUC generation mechanism 314, 314A GUC log 316, 316A, instrumentation APIs 306, 306A and middleware transport adapters 322, 322A for each particular application 304, 304A provide a technique for generically managing extensible correlation data. Correlator service 312 312A may be invoked to generate, store and provide a correlator for a particular event of a product, such as products 304, 304A or provide such a correlator for transport. Instrumentation via the APIs 306, 306A may use the correlator locally, for example, as a part of a log entry for the application. The correlator may be transported via adapted middleware to another component, for example, from product(parent) 304 to product(child) 304A, of the distributed computing system for association with another event by the correlator service local to the other component.

When middleware transport adapter 322, 322A receives an inbound transport communication including a correlator, the correlator is removed and passed to the respective CS with which the middleware transport is coupled in order that the CS may associate the inbound parent correlator with a correlator generated by the CS service. This parent correlator is linked to a correlator for an event generated by the CS Service in response to an invocation by an instrumentation API on the computer system receiving the correlator. This basic mechanism provides a framework for arbitrary applications and systems to create and communicate correlators in a distributed computing environment.

In addition to providing a service for generating and transporting correlators in a distributed computing environment, the present invention provides a generic correlator for identifying events in such an environment. Advantageously, the correlator provides correlation information that identifies a specific instrumentation call in a time sequence, even if the system clocks of one or more machines on the path of a unit of work or transaction are out of synchronization. Further, the correlation information is sufficiently granular enough to be able to uniquely distinguish between two consecutive instrumentation calls with identical clock granularity (e.g. msec).

In a high transaction environment, it is highly desired and important for performance considerations to minimize the amount of data transferred via the transport between two product instances. Accordingly, the invention provides a correlator that comprises three components, namely, a transport correlator (TransportCorrelator), a local correlator (LocalCorrelator) and a log record correlator (LogRecordCorrelator).

TransportCorrelator comprises information that is transported via transport 320 and therefore comprises a minimal amount of data required to uniquely identify a unit of work (event) to minimize performance impact or system operation. In accordance with an embodiment of the invention, TransportCorrelator chiefly comprises two components, a Globally Unique Correlator, a globally unique identifier (GUID) for the event and sequencing counters as described further below.

GUC, in an exemplary embodiment, additionally comprises a GUID length and a flag indicating a version number of the GUID generation algorithm and a type of the GUID. Table 1 shows an exemplary GUC:

TABLE 1

GUC

| GUID_Length Bytes | GUID_type | Description of GUID_data |
|---|---|---|
| 16 | "0" | GUID_data: MAC address/systemID; timestamp; processID; random counter; May be hashed to 16 (GUID_Length) bytes through a message digest algorithm such as MD5 to guarantee uniqueness and security across the entire network service by the correlator service. |

To sequentially order events from the same instrumentation, correlator service employs a process calling sequence counter and a thread calling sequence counter. Process calling sequence counter (ProcessCallingSequenceCounter) is a sequence counter at the process level for instrumentation serving this process to assist in ordering the events, for example, when clocks on different machines in the distributed computing environment are out of synchronization or when clock granularity is insufficient. This counter is incremented for each instrumentation call that occurs on any thread. If this counter rolls over and two ProcessCallingSequenceCounter values are identical within the same process, the timestamp and the order of arrival may be used for sequencing.

The thread calling sequence counter (ThreadCallingSequenceCounter) is a sequence counter at the thread level of a particular instrumentation to assist in ordering the events, for example, when clock granularity is insufficient. Also it permits the identification of the reuse of a particular thread within a process, for example, when the counter is reset to zero. This counter is incremented for each instrumentation call that occurs on a particular thread. If this counter rolls over and two ThreadCallingSequenceCounter values are identical within the same process and thread, the timestamp and the order of arrival may be used for sequencing.

To support extensibility, TransportCorrelator may include a transport correlator length, a format identifier or other flags, and a GUC length. In a further option, an additional correlator length and an additional correlator data to hold any product specific correlator data may be included.

The data that TransportCorrelator carries often needs to be updated from hop to hop (i.e. as the processing of a transaction progresses through various applications and computer systems). Each product may increase the size of the TransportCorrelator by adding their correlator data (e.g. in a name/pair value format). Accordingly a level of consistency across all applications and middlewares is maintained.

LocalCorrelator includes data such as execution environment information useful for correlation but which does not need to be transported with each event. The amount of information to include in LocalCorrelator may depend on the deterministic correlation granularity desired, for example, thread level.

LocalCorrelator comprises a GUC and optional execution environment information such as:

id—A property used to identify instances of this class.

hostID—This property represents the name or address of the system that has generated the artefact. Examples of the content of this property are IP address, VTAM LU, or the names of the host machine from which the artefact was originated.

hostIDFormat—A heuristic is defined to create the hostID to attempt to always generate the same ID, independent of discovery protocol. hostIDFormat property identifies how the hostID is generated, using a heuristic. It assumes that the documented rules are traversed in order to determine and assign a hostID.

processID—This property identifies the processID of the "running" component or subcomponent that generated the artefact.

threadID—This property identifies the threadID of the component or subcomponent indicated by the process ID that generated the artifact. A running process may spawn one or more threads to carry its function and/or incoming requests. The threadID will change accordingly.

creationTime—The time (e.g. timestamp) when the artefact was created.

artifactEncodingFormat—This property identifies the artifact encoding format (e.g. UTF-8, UTF-16, and UTF-32).

artifactCreatorID—This property is the identity of the component or subcomponent that created this artefact. The creator can be one of the various parts of a product, or OS resource (e.g., a module name).

uniqueInstanceID—The unique ID (JVM scope or C/C++ scope) for each instance of this class.

LocalCorrelator may be associated with a TransportCorrelator via its GUC. LocalCorrelator may be stored locally in a file (e.g., GUC log 314 or event log 310).

LogRecordCorrelator comprises two TransportCorrelators, namely a parent and a child TransportCorrelator. The parent TransportCorrelator is the TransportCorrelator that was received or imported into the local computer system (i.e., the remote TransportCorrelator) and the child TransportCorrelator is the current TransportCorrelator that is generated locally on the local computing system (i.e., the local TransportCorrelator).

LogRecordCorrelator is not transported but is returned to the instrumentation and logging mechanism by correlator service 312 to be logged into a file (e.g. Event log 310) as an instrumentation artefact for deterministic correlation purposes. The LogRecordCorrelator may be prepended to any instrumentation log entry to provide end to end correlation.

Persons of ordinary skill in the art will appreciate that the various correlators and GUC may be implemented in a variety of manners including as data objects with associated methods for manipulating the objects, for example, setting and getting various data as described.

Correlator service 312, as described above, is responsible to create and maintain correlators for any instrumentation calls on a particular process of product 304, 304A. Correlator service 312, 312A creates LogRecordCorrelator, updates its content and returns the correlator to the instrumentation (Parent's API 306, Child's API 306A). To provide this type of functionality, correlator service 312, 312A provides a programming model in accordance with the following requirements.

For the GUC, correlator service 312, 312A provides a mechanism for GUC insertion, query, removal, comparison and for updating each of the thread and process calling sequence counters.

For the correlator, correlator Service 312, 312A provides a mechanism to create, update, suspend, resume, associate(parent/child), destroy and stream. The following description details these operations.

The create service is a request to obtain a correlator. This service may tie into different "Factories" for different correlator types. Update provides methods to update the properties of a correlator that are permitted to be updated. Suspend temporarily suspends a correlator in use so another type of correlator can be started/requested while resume resumes a temporarily suspended correlator so the resumed correlator type can be started/requested. Associate(Parent/Child) associates an inbound parent correlator to the current or child correlator. Destroy discards a previously created correlator. Stream provides the transport (wire) definition of the correlator, in other words, streaming of a correlator object (to binary) for transmission across different protocols (RMI, JMS, SOAP over HTTP, . . . ) and rebuilding the correlator object at destination. Stream can also be used to obtain a format for persistent storage of a correlator.

In accordance with an embodiment of the invention, correlator service provides the methods described in Table 2.

TABLE 2

| | Correlator Service Methods |
|---|---|
| CorrelatorService | CorrelatorService( )<br>Default constructor. |
| byte[] | getCorrelatorStream(threadID, ProblemTokenArtifact[] properties)<br>Streams the Transport correlator into a byte stream for the middleware to flow on an outbound call. The properties parameter allows performing different type of streaming. |
| byte[] | getCorrelatorStream(ProblemTokenArtifact[] properties)<br>Streams the Transport correlator into a byte stream for the middleware to flow on an outbound call. The properties parameter allows performing different type of streaming. |
| LogRecordCorrelator | pullCorrelator(threadID)<br>Pulls the most recent LogRecordCorrelator from the Correlator Service correlation table and increments both counters. |
| LogRecordCorrelator | pullCorrelator( )<br>Pulls the most recent LogRecord Correlator from the Correlator Service correlation table and increments both counters. |
| LogRecordCorrelator | pushCorrelator(threadID, LocalCorrelator correlatorData)<br>Pushes the Application local correlator into the Correlator Service correlation table and returns the associated LogRecordCorrelator. The LocalCorrelator class needs to provide a toXML( ) method to stream the object, store the XML string into the GUID.log or Event.log file. |
| GUC | getGloballyUniqueCorrelator(GUC_type)<br>Returns a new GUC to the caller based on the GUC type. |
| LogRecordCorrelator | pushCorrelator(threadID, LogRecordCorrelator correlator)<br>Updates the LogRecordCorrelator counters into the Correlator Service correlation table and returns the associated LogRecordCorrelator. |
| LogRecordCorrelator | pushCorrelator(LogRecordCorrelator correlator)<br>Updates the LogRecordCorrelator counters into the Correlator Service correlation table and returns the associated LogRecordCorrelator. |
| int | associateRemoteCorrelator(threadID, |

TABLE 2-continued

| | Correlator Service Methods |
|---|---|
| CorrelatorService | CorrelatorService( )<br>Default constructor. |
| | byte[] correlator)<br>Associates the parent correlator for the affected LogRecordCorrelator(s) when an inbound middleware call is received. |
| int | associateRemoteCorrelator(byte[] correlator)<br>Associates the parent correlator for the affected LogRecordCorrelator(s) when an inbound middleware call is received. |
| Int | start( )<br>Starts the Correlator Service class. |
| Int | stop( )<br>Stops the Correlator Service class. |
| Long | incrementProcessCallSeqCtr( )<br>Increments the ProcessCallingSequenceCounter and returns the updated value. It is called when a LocalCorrelator is created on a thread and every time an instrumentation call occurs on any thread within the process. The return value will be the value stored in the TransportCorrelator. For GUC that do not have a counter, this value may just be incremented but will not be put on the wire |

Figure 4A:
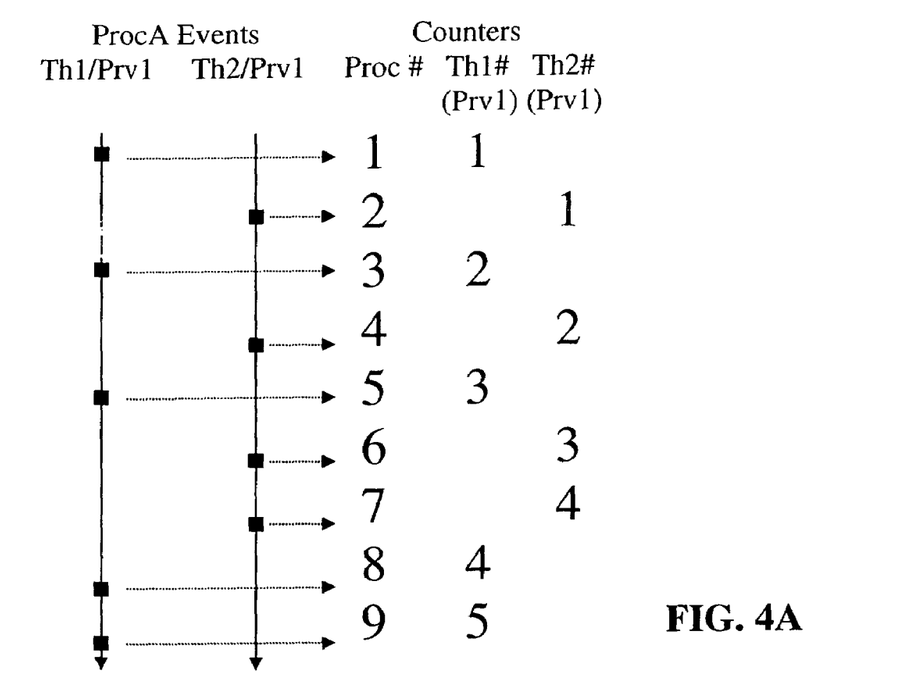
FIGS. 4A, 4B and 4C show exemplary event occurrence time lines and counter assignments to the events of various process/thread/instrumentation provider scenarios.
Figure 4B:
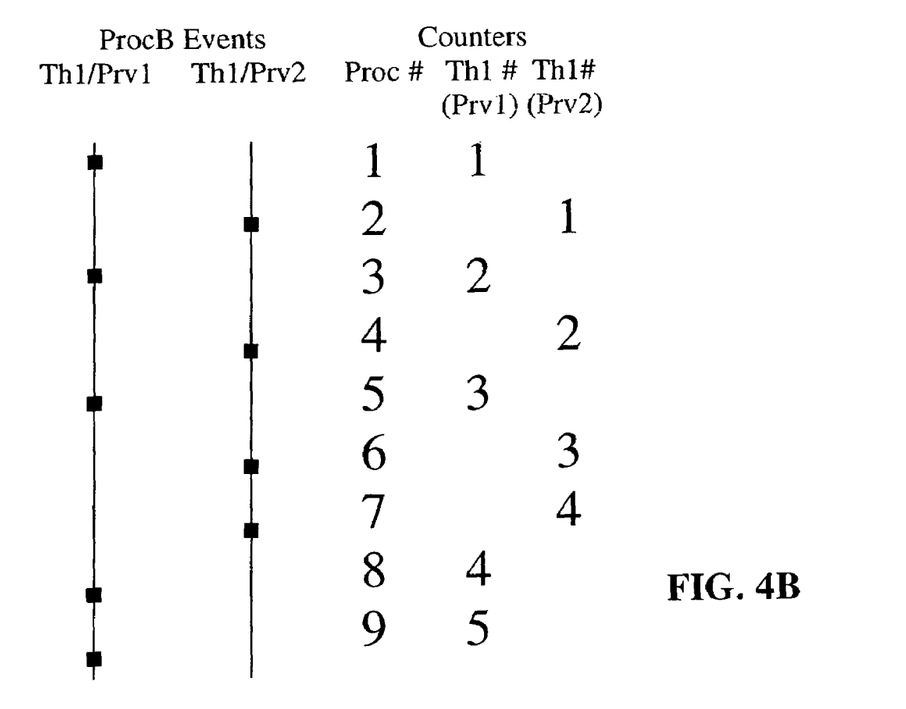
Figure 4C:
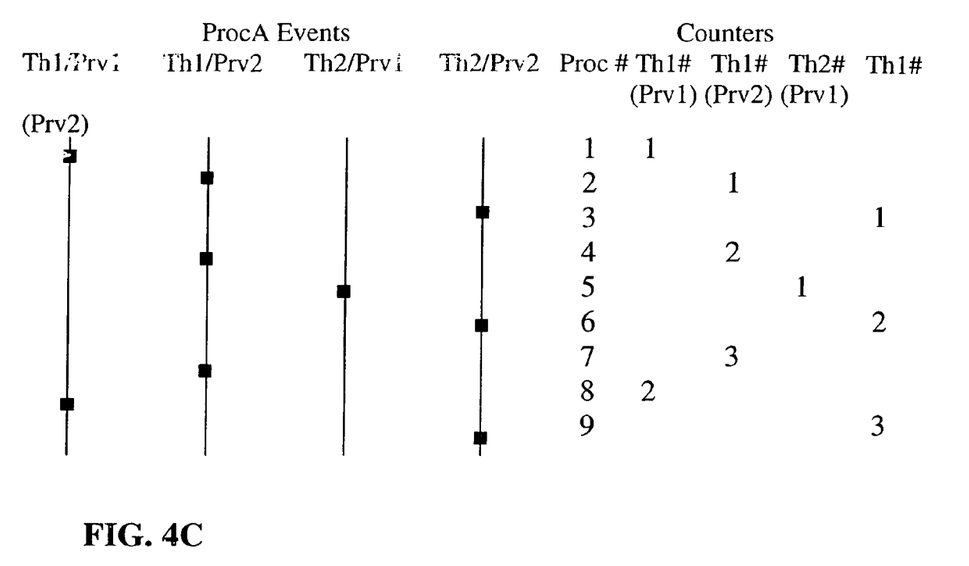

With reference to FIGS. 4A, 4B and 4C, there is illustrated the assignment of process and thread sequence counters to exemplary event occurrences for, respectively, a single provider instrumented on a multi-threaded process, multiple providers instrumented on a single threaded process and multiple providers instrumented on a multi-threaded process. For the purposes of simplification, FIGS. 4A, 4B and 4C illustrate at most two threads and two providers but it is understood that additional threads or providers are contemplated by the invention.

With reference to FIG. 4A there is illustrated an event line for each of two threads TH1 and TH2 of process ProcA instrumented by single instrumentation provider, Prov1. The process calling sequence counter is represented by counter Proc# counting each of the nine sample events. The respective thread calling sequence counters TH1# and TH2# assign respective counts to the events that occur on the respective threads. Collectively, the nine events produce the following process sequence count and thread sequence count pairs (Proc#, THn#): (1,1) (2,1) (3,2) (4,2) (5,3) (6,3) (7,4) (8,4) and (9,5). As understood to persons skilled in the art, the assignment of a unique count to a process sequence counter, for example, of a correlator may be accomplished through well known steps to lock access to the counter supplying the count.

With reference to FIG. 4B there is illustrated an event line for each of two instrumentation providers Prov1 and Prov2 instrumented on one thread TH1 of a process ProcB. It is noted that for the same nine sample events as depicted in FIG. 4A, the process sequence count and thread sequence count pairs are the same. With reference to FIG. 4C there is shown an event line for each of two providers Prov1 and Prov2 instrumented on two threads TH1 and TH2 of process ProcA to illustrate a further example of the assignment of a temporal identifier.

Thus the process calling sequence counter and thread calling sequence counter assign unique sequencing identifiers to event occurrences generally identified by the GUC and optionally other geographic and logical identifiers within the generic correlator structure. The counters provide temporal granularity independent of a time stamp or other system clock reference.

Figure 5A:
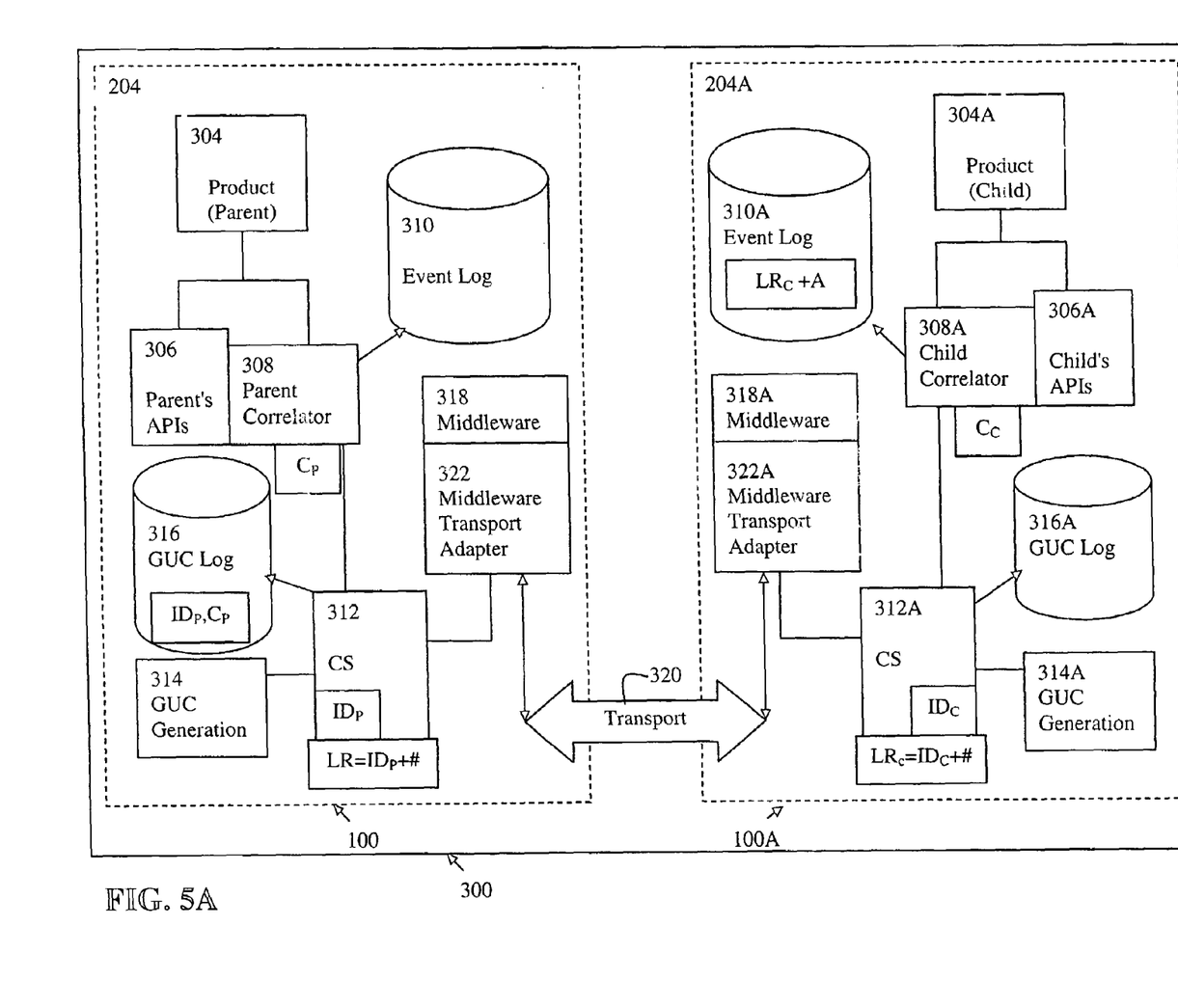
FIGS. 5A, 5B, 5C and 5D show in greater detail the memory illustrated in FIG. 3 for a various instances of an exemplary correlator flow with correlator artefacts.

FIGS. 5A, 5B, 5C and 5D illustrate operations of a correlator flow showing artefacts in memory as depicted in FIG. 3. With reference to FIG. 5A, and memory 204 of computer system 100, parent's API 306 is called from product(parent) 304, for example, prior to a transactional event to be initiated with product(child) 304A. Parent's API 306 generates some correlation information $C_P$ that doesn't need to be transported to computer system 100A on which product(child) is executing but which may be useful for a LocalCorrelator. Parent's API 306 calls Correlator Service 312 (CS) with the correlation information using the pushCorrelator method described previously. CS 312 calls GUC generation mechanism 314 and receives a GUC, namely, $ID_P$ generated to uniquely identify the event.

CS 312 logs the GUC, $ID_P$, and its associated LocalCorrelator $C_P$ in the GUC log 316 or event log 310 (not shown) indexed by GUC (i.e. $ID_P$).

CS creates a LogRecordCorrelator ($LR_P$) which creates the current or child TransportCorrelator ($ID_P$+#) and returns the LogRecordCorrelator ($LR_P=ID_P$+#) to the parent's API call. As this exemplary call initiates a transaction, it has no parent call from another product and no parent TransportCorrelator exists for associating in the LogRecordCorrelator $LR_P$. The TransportCorrelator $ID_P$+# is considered a child TransportCorrelator when viewed in relation to the role of system 100 in the transaction since system 100 generated it. CS 312 increments the process and thread calling sequence counter fields before returning the LogRecordCorrelator holding the GUC and counters. Similar artefacts are shown in memory 204A of computer system 100A for a prior event of product (child) which persons of ordinary skill in the art will understand were generated in a like manner.

Figure 5B:
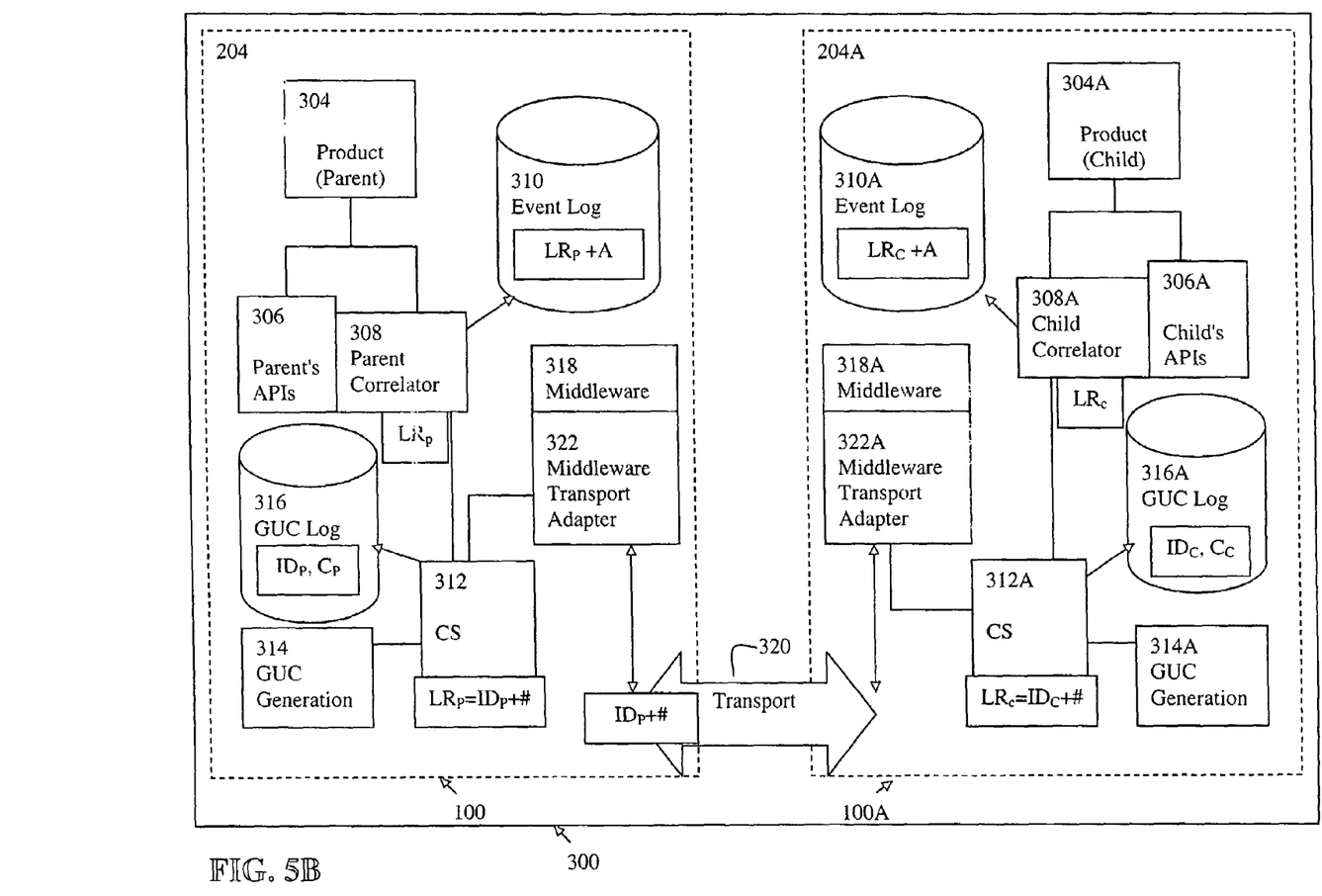

FIG. 5B shows a later instance of correlator flow where Parent's API calls its current recording mechanism (not shown) to store the LogRecordCorrelator and event data (A), comprising substantive data related to the function or service provided by the instrumentation for later analysis to Event log 30. Thereafter, product(parent) 304 application makes an outbound call (e.g. remote method call) to product(child) 304A.

Middleware 318 intercepts the outbound call and then calls middleware transport adapter 322 which calls getCorrelatorStream of CS 312 to get the TransportCorrelator ($ID_P$+#) associated with this execution thread. CS 312 returns the most recent TransportCorrelator associated with this execution thread to middleware transport adapter 322. Middleware transport adapter 322 then puts the TransportCorrelator on the transport wire 320.

Figure 5C:
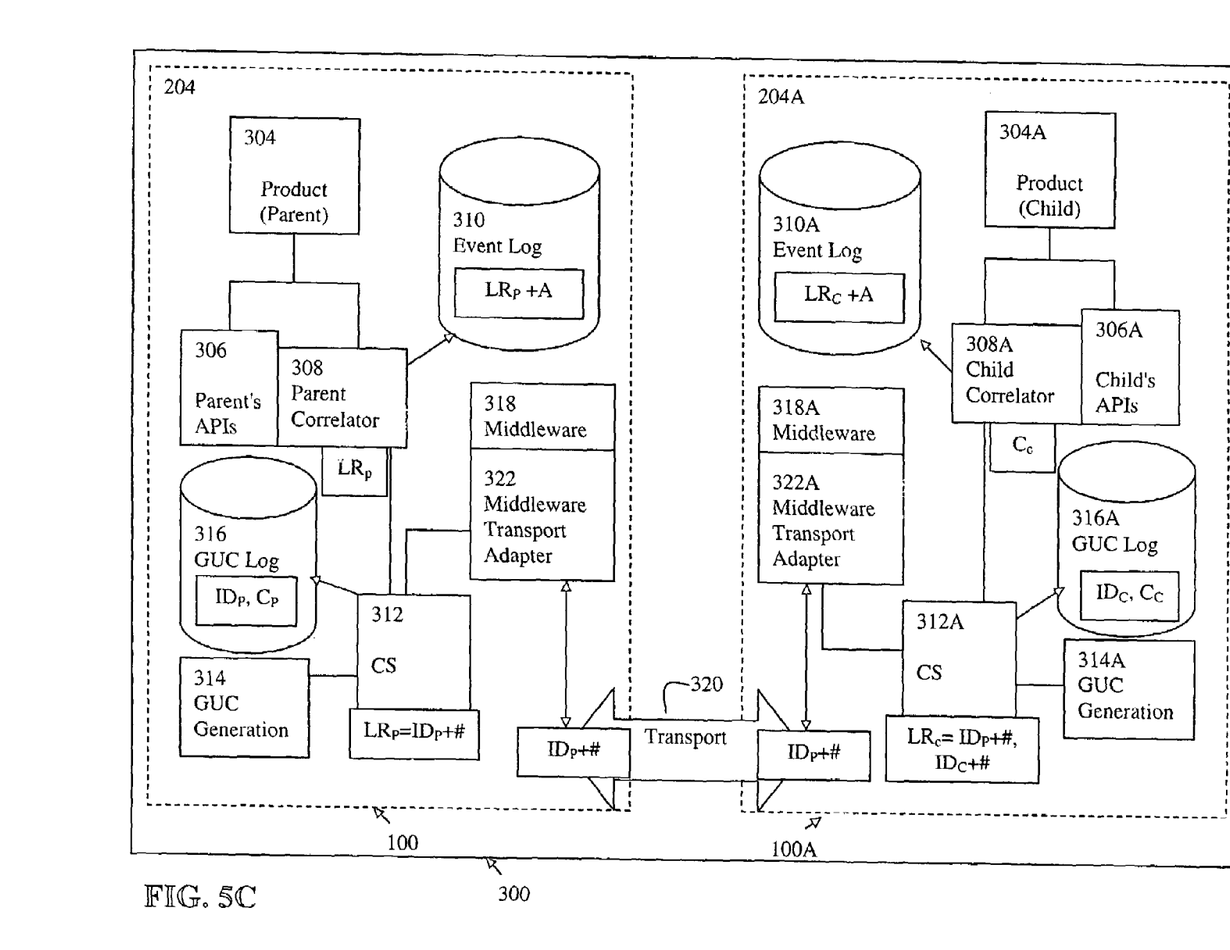

FIG. 5C shows a further instance of the exemplary correlator flow as the TransportCorrelator $ID_P$+# reaches the computer system 100A to become the parent TransportCorrelator for the associated local TransportCorrelator $ID_C$+#. Middleware transport adapter 322A extracts the parent TransportCorrelator from the transport 320 and then calls the CS programming model associateRemoteCorrelator method, providing $ID_P$+#. CS 312A then stores the parent TransportCorrelator ($ID_P$+#) with the current LogRecordCorrelator ($LR_P$) into the CS 312A ($LR_C=ID_P$+#, $ID_C$+#).

Middleware Transport 318A then calls the product(child) application method associated with the inbound request.

Figure 5D:
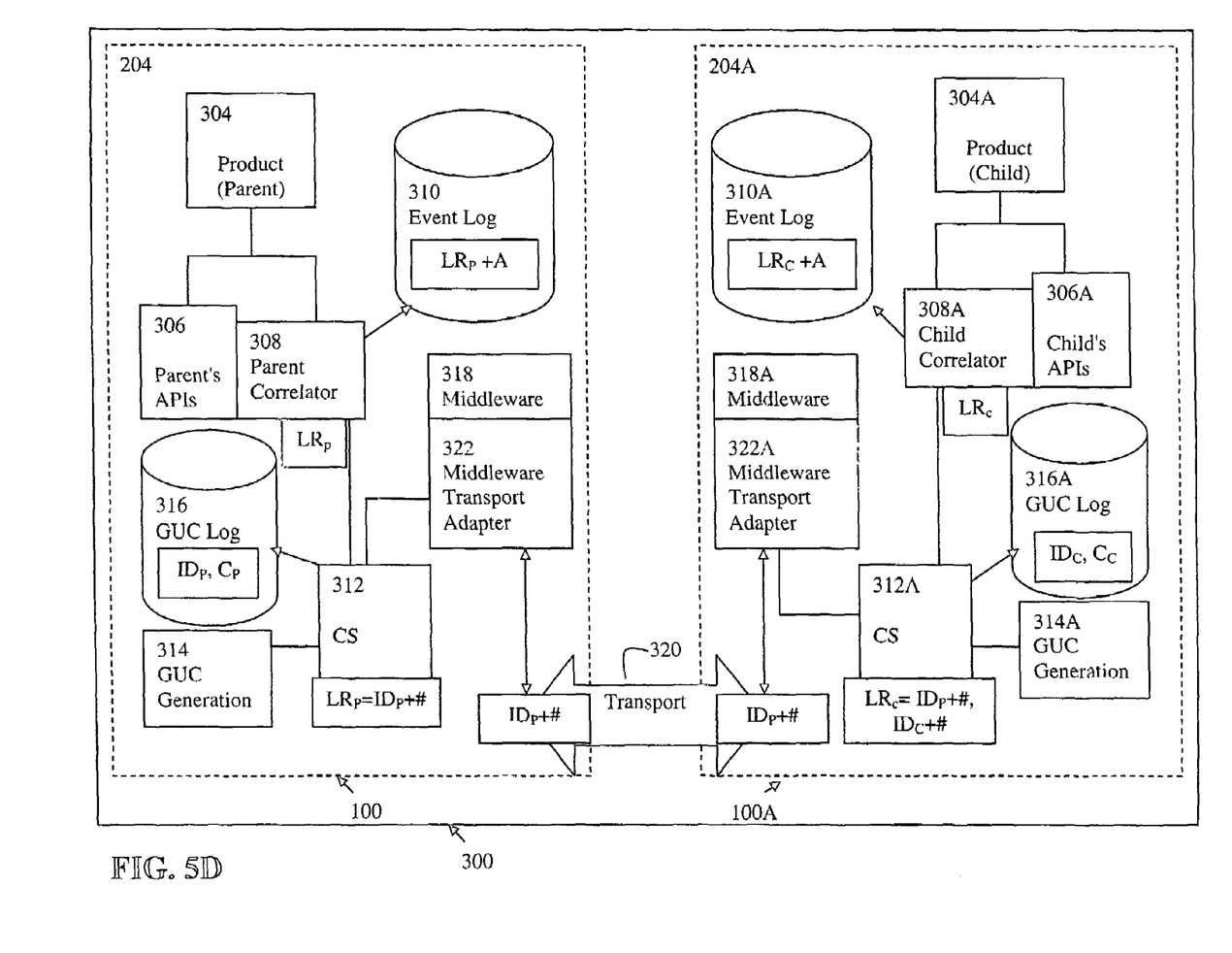

FIG. 5D shows a final instance of the exemplary correlator flow. Product(child) 304A invoked by the receipt of the transaction via middleware 318A calls its instrumentation via child's APIs 306A. Child's API 306A calls the incrementCorrelator method of CS 312A since there was already a CorrelatorService created on the thread. Alternatively, a CorrelatorService may be initiated.

CS 312 retrieves the current LogRecordCorrelator ($LR_C=ID_C$+#, $ID_P$+#) now containing the associated parent TransportCorrelator. and returns it with incremented counters to the child's API 306A call. CS 312 then resets the parent TransportCorrelator information from its internal copy of the LogRecordCorrelator.

Child's API 306A then calls its current recording mechanism (not shown) to store LogRecordCorrelator ($LR_C=ID_C$+#, $ID_P$+#) and the event data (A) for the instrumentation for later analysis to event log 310A. The GUCs generated by each system may be used to associate events between logs as well as within logs. The sequence counters may be used within logs to put events in sequence.

A tool may be configured to interpret GUC logs and event logs from networked computer systems among which correlators in accordance with the invention are employed to correlate events. Such correlated events may then be used for various purposes, for example, such as tracing, performance analysis or problem determination. A correlation tool (CT) (not shown) may be configured to perform the following exemplary operations to correlate events, in accordance with an aspect of the invention.

Assuming that the GUC log (316, 316A) data has been logged in the respective event log file (310, 310A) on each computer system to be correlated, CT opens an event log file on a machine (eg. 100A). It reads two types of log records: the records holding LocalCorrelator (i.e. GUC log data) as well as the records holding the LogRecordCorrelator (event log data). Next CT associates all the child TransportCorrelator GUCs with their corresponding LocalCorrelators.

CT then attempts to associate the parent TransportCorrelator GUCs with their corresponding LocalCorrelator. If CT can't associate the parent TransportCorrelator GUC with its corresponding LocalCorrelator, it opens another event log file on another machine (e.g. 100) and performs the steps again.

CT performs the steps until it has processed all the event log files from its known network topology. Once it has found the parent TransportCorrelator GUC on a machine, CT will then find the corresponding LogRecordCorrelator that has a child TransportCorrelator equal to the parent TransportCorrelator and associate them. Then, CT can create correlated views of the events and event data (A) at different granularities based on the GUC and LocalCorrelator contents.

The invention provides associative correlation by assigning a unique ID to a group of events (typically the events related the processing of a request by a specific product). The unique ID is unique in space and time to provide robust correlation. Each event record in an instrumentation log contains information that identifies the ID defined for the event (typically the ID is contained in each log or trace record in the group). Different groups of events (e.g. the events associated with processing a request by several products) are then combined by providing additional information that associates the IDs for each group with one another. Sequential correlation is performed by adding event sequencing information to the unique ID, creating a correlator that provides both associative and sequential correlation.

The unique ID acts as a key for associating different correlation information for an event. Moreover, it is adapted to minimally impact performance when communicated between products and when logged. By exchanging only the unique ID, runtime performance is enhanced.

A Globally Unique Correlator (GUC) may be defined for the GUID and optional sequence information and is described herein as an open structure, meaning an implementation can use any data structure that provides the appropriate associative and sequential correlation properties. An exemplary GUC implementation, although described for use in problem determination, is meant to be a general purpose correlator that can be used to correlate events for any purpose.

The embodiment(s) of the invention described above is(are) intended to be exemplary only. The scope of the invention is therefore intended to be limited solely by the scope of the appended claims.

We claim:

1. A correlator service being stored on a computer readable storage medium for correlating a series of events, the correlator service comprising:

a mechanism which when executed by a processor for generating a first Globally Unique Correlator (GUC) adapted to uniquely identify one or more occurrences of an event among the series of events wherein the first GUC comprises a globally unique identifier (GUID) to uniquely identify the one or more occurrences of the event, wherein the first GUC further comprises two or more sequence counters, said correlator service adapted to maintain the two or more sequence counters for identifying a sequence of the one or more occurrences of the event;

a mechanism which when executed by the processor, generating a correlator, the generated correlator comprising an event identifier and a temporal identifier for the event wherein a first characteristic of the event is defined by a process generating the event and wherein one of the two or more sequence counters defines a process sequential counter responsive to the first characteristic to sequentially order all executions of the process and wherein the temporal identifier comprises a count of the process sequential counter, wherein a second characteristic of the event is defined by a thread of the process generating the event and wherein another one of the two or more sequence counters defines a thread sequential counter responsive to the second characteristic to sequentially order all executions of the thread of the process and wherein the temporal identifier comprises a count of the thread sequential counter, wherein a third characteristic of the event is defined by a provider requiring the generated correlator and wherein the thread sequential counter is further responsive to the third characteristic to sequentially order all executions of the thread for the provider; and said correlator service adapted to provide the GUC for defining a key for associating one or more extensible correlators for each occurrence of the event, wherein one of the extensible correlators comprises a transport correlator for including in a first communication adapted to transport the transport correlator for associating the first GUC with a second GUC identifying an occurrence of a second event having a relationship with the event and wherein said transport correlator is configured to minimally impact the transport of the communication, wherein the first communication comprises a second communication for causing the occurrence of the second event, wherein the first communication is facilitated by a middleware and wherein the correlator service is adapted to provide the transport correlator to said middleware.

2. A computer readable medium containing executable program instructions which when executed by a processor provide a correlator for an event of a series of events occurring on a computer and for which correlators are desired, the program instructions including program instructions for:

determining first data representative of optional context information for the event;

determining an event identifier comprising second data representative of one or more identifiers selected from a group consisting of geographical identifiers and logical identifiers for the event;

configuring the first data representative of optional context information for the event in accordance with a protocol for the exchange of information;

assigning a temporal identifier comprising third data representative of a unique temporal order of the event in the series of events from one or more sequential counters each responsive to a characteristic of the event;

generating a local correlator comprising the event identifier, the first data representative of optional context information for the event in accordance with the protocol for the exchange of information, and the temporal identifier for the event, wherein a first characteristic of the event is defined by a process generating the event and wherein one of the sequential counters defines a process sequential counter responsive to the first characteristic to sequentially order all executions of the process and wherein the temporal identifier comprises a count of the process sequential counter, wherein a second characteristic of the event is defined by a thread of the process generating the event and wherein one of the sequential counters defines a thread sequential counter responsive to the second characteristic to sequentially order all executions of the thread of the process and wherein the temporal identifier comprises a count of the thread sequential counter, wherein a third characteristic of the event is defined by a provider requiring the local correlator and wherein the thread sequential counter is further responsive to the third characteristic to count all of the events of the thread for the provider; and defining data representative of an association between the local correlator for the event and a partner correlator comprising a correlator for a second event, the local correlator being a parent correlator and the partner correlator being a child correlator;

receiving data for defining the partner correlator for the event; and generating the partner correlator in accordance with the data received; and generating the correlator with the data representative of the association.

* * * * *